Jan. 19, 1943.       D. GREGG ET AL       2,309,064
PRESSURE CONTROL SYSTEM
Filed Jan. 4, 1941
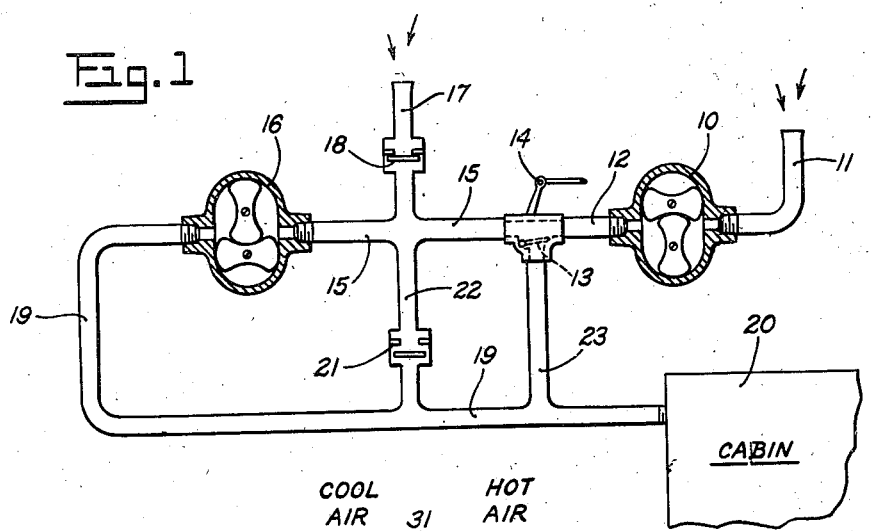
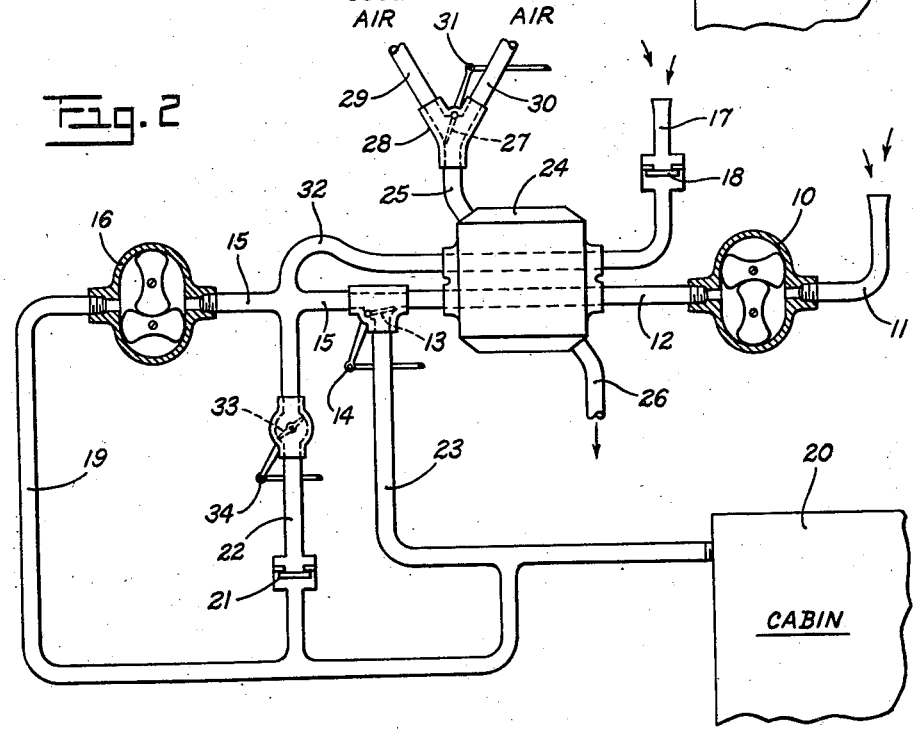
INVENTORS.
David Gregg
Donald M. Lawrence
BY
ATTORNEY.

Patented Jan. 19, 1943

2,309,064

UNITED STATES PATENT OFFICE 2,309,064

PRESSURE CONTROL SYSTEM

David Gregg, Caldwell, and Donald M. Lawrence, Newark, N. J., assignors to Bendix Aviation Corporation, South Bend, Ind., a corporation of Delaware Application January 4, 1941, Serial No. 373,178

2 Claims. (Cl. 128—204)

This invention relates to pressure systems and more particularly to the design of a multi-stage supercharger for aircraft cabins.

High altitude flying in scheduled transportation and in military missions has been advanced because of the sealing and supercharging of the cabins containing passengers and crew. Several systems for the accomplishment of the necessary supercharging have been designed, but none of these systems, prior to the present invention, have taught how to avoid the excessive heating of the inlet air at low altitudes, or have the flexibility necessary to maintain cabin pressures under different flight conditions which may be met with in varying altitudes with compression and volume demands varying within wide limits.

It is an object of the present invention to provide a multi-stage supercharging system for aircraft cabins, wherein the cooling of hot inlet air may be accomplished by the circuit arrangement of the supercharging system.

It is another object of the invention to provide a flexible supercharging system which, depending upon the pressure demand in a cabin, may automatically be changed from a single to multiple stage operation.

Further objects include the provision of a system adapted for single or multi-stage operation by a simple adjustment, and of a means, in a multi-stage system, for cooling or heating the air at will.

Other objects will appear from a study of the following specification when made in conjunction with the attached drawing, throughout which like numerals designate like parts.

Fig. 1 is a schematic diagram of one embodiment of the present invention; and

Fig. 2 is a schematic diagram of a second embodiment of the present invention.

In accordance with the present invention, two superchargers, one of which has a capacity greater than the other, have individual air input conduits, and have their outputs capable of connection to an aircraft cabin either in series or in parallel, depending upon the pressure and volume requirements to be met. Several automatic check valves, and one or more motor or manually controlled valves, are supplied in the air connections between the two superchargers and between the cabin, for permitting single or multi-stage operation, and also for accomplishing the cooling or heating of input air before its entrance to the cabin, under particular operating conditions.

Having particular reference to Fig. 1, supercharger 10, of the "Roots" type, as shown, has an air inlet or scoop 11, which may be located in a leading portion of the aircraft, and an output or exhaust conduit 12 in which there is placed a valve 13 capable of manual or motor operation through the valve arm and rod 14. One outlet of valve 13 connects to a conduit 15 on the input side of a second supercharger 16. The capacity of supercharger 10 is greater than the capacity of supercharger 16. The difference in capacity may be on the order of 25 to 50% and may be obtained in any of several ways; for example, the superchargers may be of equal physical dimensions but driven (by the same or by separate engines) at different speeds, or they may be of different physical dimensions and driven at the same speed (by the same or by different engines).

Input conduit 15 is open to an air intake or scoop 17, which may be placed in the leading portion of the aircraft, having a check valve 18 which permits the entrance of air through scoop 17 under certain pressure conditions, but prevents exit of air therethrough. The output of supercharger 16 is connected by a conduit 19 to the input of cabin 20. Another check valve 21, which permits flow of air into conduit 19 and cabin 20, is placed in a conduit 22, which is in communication with output air flowing from supercharger 10 through conduit 15 and with input air flowing into supercharger 16 through conduit 15. An additional conduit 23 is provided between output conduit 12 and conduit 19 and acts as a by-pass for air from supercharger 10 under certain conditions of operation.

When valve 13 is in its open position, as shown, the supercharging system is in condition for two-stage operation, the condition of operation that gives the maximum pressure range of the system, so that cabin pressure may be maintained at any desired value from sea level to ten thousand feet regardless of external pressures at the higher altitudes. At the lower altitudes, because of the high external pressures, air compressed in supercharger 10 drives supercharger 16 as a motor, due to its inferior capacity, returning work to the engine driving supercharger 16 and expanding the air in the output 19 of supercharger 16, thus decreasing its temperature. A part of the air in conduit 15, due to its compression in supercharger 10 and to the low capacity of supercharger 16, enters cabin 20 through valve 21 and conduit 22. As the altitude of the craft increases, the input pressure to supercharger 10 decreases, and thus the pressure in conduit 15 decreases, so that a greater amount of air is accepted through supercharger 16 and less flows through valve 21. Finally, as external pressure continues to drop, the back pressure of cabin 20 becomes equal to the pressure in conduit 15, and valve 21 closes, making supercharger 10 the first stage of a two-stage system, and supercharger 16 compresses air from conduit 15 which enters conduit 19 and cabin 20 at a pressure greater than that of the atmosphere and greater than that in conduit 15. It is understood that the correct pressure for cabin 20 may be maintained by means of any suitable pressure control system, for example, that described in the co-pending case of David Gregg, Serial No. 372,692, filed December 31, 1940.

If, particularly at the lower altitudes, there is an unusual demand for a larger volume of air, then superchargers may be thrown into parallel operation by the closure of conduit 15 by valve 13, in its vertical position. Air compressed in supercharger 10 then goes directly to cabin 20 through conduit 23, and valve 18 opens to admit air through scoop 17, which is compressed in supercharger 16 and fed to cabin 20 through conduit 19. Since the pressure in conduit 15 is lower, under these circumstances, than that in conduit 19, valve 21 will be forced to its closed position, so that all the air from both superchargers is directed into cabin 20 to supply the demand therefor.

A portion of the heat is removed from the air at low altitudes when the system is operating with valve 13 open, as shown. Assuming that cabin pressure is to be kept at 22 inches of mercury, corresponding to an altitude of 8,000 feet, then for altitudes a certain amount above (depending on the compression ratio of supercharger 10) 8,000 feet, down to sea level, the pressure in conduit 15 is greater than the pressure in cabin 20, and some air will be admitted through valve 21. Due to compression, this air will be warmer than atmospheric air and may be too warm for comfort. In this condition of operation, however, supercharger 16 is being driven as a motor and the pressure of air in conduit 19 is less than the pressure in conduit 15, so that the air in conduit 19 is cooler than the compressed air entering cabin 20 from conduit 21. Thus, when summer atmospheric temperatures may be too high for comfort, the air expanded in supercharger 16 aids in the cooling of the cabin 20, and under certain conditions, no further cooling of cabin air may be necessary. Fig. 2 shows a system similar in most respects to that shown in Fig. 1, but which provides for the cooling and heating of air under all operating conditions, and like numerals designate like parts described in Fig. 1.

Where the temperature of the atmospheric air varies or is different, by quite an amount, from the temperature which it is desired to maintain in cabin 20, it will be found necessary to cool or to heat the air for the comfort of the passengers. For this purpose a heat exchange unit 24 having an inlet passage 25 and an outlet 26 is positioned about conduit 12 so that heat may be transferred from conduit 12 to heat exchange unit 24 or vice versa, as operating conditions dictate. A two-position valve 27 is placed in a Y connection member 28 to which are attached conduits 29 and 30. Valve 27 is manually or motor controlled through a valve arm and connecting rod 31. As indicated by the legend, cool air, from a source not shown, which may be a ram located in a leading portion of the craft, may be passed through conduit 29 when valve 27 opens this conduit, and heat, caused by the compression of air in supercharger 10, will be absorbed and carried away from conduit 12 through passage 26. Conduit 30 carries hot air which may be from any source, not shown, such as the exhaust stack of an engine, passed through heat exchange unit 24 when valve 27 is in the position shown, and thus additional heat may be imparted to the air under pressure in conduits 12 and 15, so that the air entering cabin 20 may be at a comfortable temperature, even though the atmospheric air is in the zero or minus zero region.

The air delivered to the cabin 20 may be heated or cooled by means of heat transfer device 24. When the superchargers are operating in series, the output conduit 12 being in heat exchange relation to transfer unit 24, the temperature of the air in output conduit 19 and in cabin 20 can be closely controlled. When the superchargers are operating in parallel, that is, when valve 13 is raised to its closed (vertical) position the output of supercharger 10 will be diverted through conduit 23 to cabin 20 at the temperature desired, and the input air from scoop 17 to supercharger 16 passes through a conduit 32 which, like conduit 12, is in heat exchange relation to heat transfer unit 24, and thus, air in output conduit 19 may be delivered to cabin 20 at the desired temperature.

An additional valve 33, which may be manually or motor operated through valve arm and rod 34, is placed in conduit 22, and in its closed position, as shown, it prevents the by-passing of any air from supercharger 10 into cabin 20 through conduit 22 at all altitudes, so that when superchargers 10 and 16 are operating in series (two-stage), and when it is desired to decrease the air entering cabin 20 to a temperature below that of the external atmosphere, valve 27 is thrown to its right-hand position stopping the flow of hot air through conduit 30 and permitting cool air to enter heat exchanger 24 through conduit 29, wherein it is circulated about conduit 15, absorbing heat caused by the compression of air in supercharger 10. The temperature of air in input conduit 15, therefore, may be made much lower than the temperature of the external atmosphere. Further, due to the fact that the capacity of supercharger 16 is less than that of supercharger 10, the air in input conduit 15 will be at a greater pressure than that in the output conduit 19. Because of its expansion in supercharger 16, the air in conduit 19, and therefore in cabin 20, will be at a lower temperature than that in input conduit 15. The expansion of supercharged air in supercharger 16, increases the amount of cooling that can be obtained by merely passing the supercharged air through the intercooler or heat exchanger 24, and therefore the range of temperature drop between the atmospheric air and cabin air is increased beyond that possible with only a heat exchanger such as 24.

In the event that the air expanded by supercharger 16 is cooler than desired for cabin 20, the valve 33 may be opened to admit air to cabin 20 from conduits 15 and 22. This air will pass through check valve 21 because the pressure of air in input conduit 15 is greater than the pressure in conduit 19 and the temperature of air in conduit 15 will be higher than the temperature of air in conduit 19, and the air in conduit 19 will therefore, upon mixing with air in conduit 22, suffer an increase in temperature prior to entrance to cabin 20. If desired valve 33 may be thermostatically controlled in order that it may be opened or closed to maintain the cabin air 20 at its required temperature.

While superchargers 10 and 16 have been shown as "Roots" blowers, other types, such as centrifugal superchargers, may be used in the system described.

Valves 13 and 33 may be operated manually by the pilot, or automatically by any conventional pressure responsive device and a relay, but as the particular mode of operating the valves forms no part of the invention, any showing of valve controls has been omitted.

While only two embodiments of the present invention have been shown in the drawing, it is to be understood that various changes may be made without departing from the scope of the present invention. For this reason, it is intended not to limit the invention by the description herein given as an example, but solely by the scope of the appended claims.

What is claimed is:

1. A supercharging system for aircraft cabins including a first supercharger having an air intake and an air exhaust, a by-pass passage connected to said exhaust and to a cabin, a second supercharger of less capacity than said first supercharger, an air intake therefor and a conduit between the input of said second supercharger and the exhaust of said first supercharger, a by-pass valve located at a connection between said conduit and said by-pass passage, an output passage connected to said second supercharger and to said cabin, a check valve in the intake for said second supercharger, a second conduit connected to said conduit between said superchargers and to said cabin, a check valve therein, and a heat exchanging member arranged in heat transfer relation to the conduit between said superchargers, whereby air compressed in said first supercharger, may suffer a heat exchange with respect to said heat exchanging member and be introduced into said cabin after passage through said second supercharger, at a temperature other than the temperature of air compressed by said first supercharger.

2. A system of cabin supercharging comprising a cabin, an air inlet thereto, a first supercharger of unit capacity having an air inlet and an air outlet, a second supercharger of less than unit capacity having an air intake and an air inlet connected to the air outlet of said first supercharger and an air outlet connected to the air inlet to said cabin, an air by-pass connected to the air inlet to said cabin and to the outlet of said first supercharger, a by-pass valve located in the outlet of said first supercharger at said by-pass connection, control means for the actuation of said valve to selectively place said superchargers in series or in parallel, a communicating channel between the outlet of said first supercharger and the air inlet to said cabin, and a check valve therein and opening toward said cabin so that for certain pressure relations when said superchargers are operating in series, a portion of the air compressed by said supercharger may be passed to the inlet of said cabin in parallel with the air passing through said second supercharger.

DAVID GREGG.
DONALD M. LAWRENCE.